Feb. 18, 1964   H. PACKARD   3,121,851
ELECTROMAGNETIC TRANSDUCER

Filed Sept. 6, 1961   2 Sheets-Sheet 1

INVENTOR.
HENRY PACKARD
BY Kenway, Jenney & Hildreth
ATTORNEYS

United States Patent Office 3,121,851
Patented Feb. 18, 1964

3,121,851
ELECTROMAGNETIC TRANSDUCER
Henry Packard, Norwood, Mass., assignor to Northrop Corporation, Beverly Hills, Calif., a corporation of California
Filed Sept. 6, 1961, Ser. No. 136,315
3 Claims. (Cl. 336—130)

This invention relates to electromagnetic transducers of a type useful either as torque motors or as angular displacement-sensing devices.

The present invention is directed to an electromagnetic transducer including an annular magnetic core structure having a suitable winding, and forming an air gap in which a non-magnetic armature is mounted for angular displacement. The armature is wound with coils for reaction with a field established by salient poles of the core structure. Such a device may be utilized as a torque motor by applying suitable voltages to the windings of both the core structures and the armature; or alternatively, as a means for continuously measuring the angular displacement of the armature from a null position, by applying an A.C. voltage to the core winding. In the latter case, the sense and extent of angular displacement is indicated by the phase relationship and magnitude of a voltage induced in the armature coils.

Because the movable element of a transducer of this type is made entirely of non-magnetic material, there are inherently no magnetic reaction torques imposed upon the structure, as contrasted with variable-reluctance transducers such as microsyns. Furthermore, the non-magnetic armature incorporates relatively little mass, so that the inertia of an angularly-displaceable device in conjunction with which the transducer is utilized, such as a gyroscope, may be correspondingly reduced.

In accordance with the present invention, an electromagnetic transducer is provided in which a core structure of the well-known "Lundell" type is combined with a non-magnetic rotatable armature having a plurality of pancake coils wound thereon and connected in two circumferentially-alternated series-opposed groups. The Lundell core structure includes an energizing coil wound about the interior of an annular yoke, which has a plurality of internal pole pieces extending parallel to its major axis in opposite directions, to form two groups of opposed poles in circumferentially-alternated relation. Within these groups of opposed poles is mounted an annular return ring to complete flux paths extending across an air gap formed between the yoke and the return ring. Into this air gap is extended the armature, mounted for relative angular displacement. Each pancake coil of the armature extends through an arc equal to or slightly less than the angular pitch of the poles, so that in a null position, each pancake coil extends between the centers of adjacent opposed poles.

In use as a torque motor, alternating or direct current is impressed upon both the core winding and the armature windings to produce a torque which attains a maximum about the previously referred-to null position, and drops off sharply as the angular displacement is increased to bring the radial axis of each pancake coil into alignment with one of the poles of the core structure. However, the torque is substantially linear over a substantial arc of displacement of the armature from the null position. The substantially linear torque response may typically extend over +/−5°, which is adequate for applications of the torque motor to typical gyroscope devices.

In use as a pick-off device, the energizing winding of the Lundell core structure is impressed with an alternating current voltage of predetermined frequency, and the output voltage of the armature windings is measured in parallel with a suitable fixed resistance to indicate, by its phase and magnitude, the sense and extent of the angular displacement. The response is substantially linear over an angle of displacement from the null position in either direction, which is ample for the intended uses.

It is, accordingly, an object of the present invention to provide an improved angular-motion electromagnetic transducer which affords increased efficiency in the transducing function.

It is another object of the invention to provide an improved electromagnetic transducer, in which all of the elements of a magentic core structure are stationarily mounted, and in which an angularly-displaceable armature contains no magnetic material and inherently produces no reaction torque.

It is still another object of the invention to provide an angular-motion transducer which may be utilized alternatively as a torque motor or as an angular-displacement sensing device of improved sensitivity and accuracy.

Further objects and advantages of the invention will become apparent from the following detailed description of a preferred embodiment thereof, referring to the accompanying drawings, in which.

Figure 1:
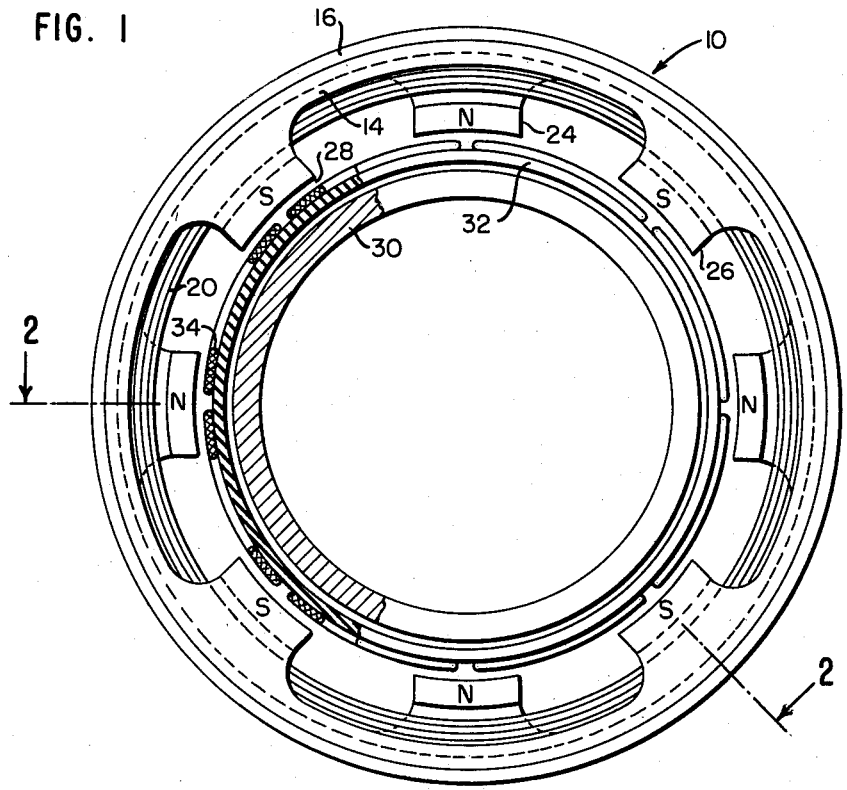
FIG. 1 is a sectional end view of a preferred embodiment of the improved transducer.
Figure 2:
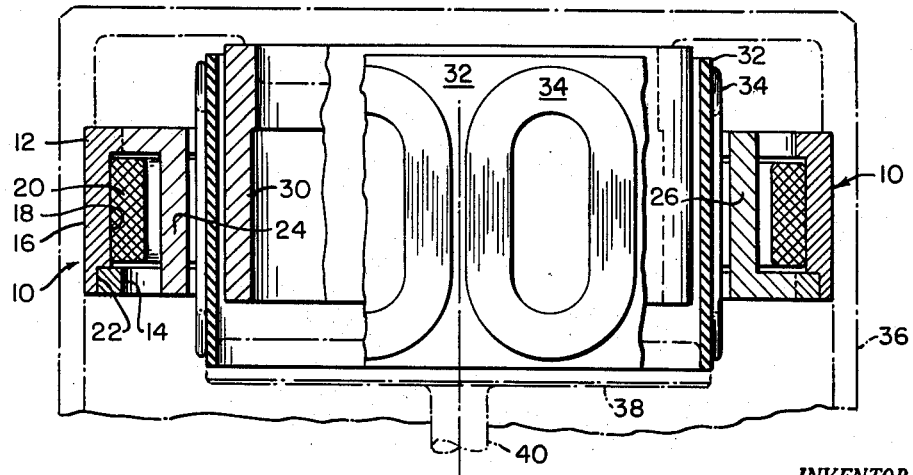
FIG. 2 is a sectional view taken along line 2—2 in FIG. 1, looking in the direction of the arrows.

Referring to FIGS. 1 and 2, a preferrad embodiment of the improved transducer includes a magnetic core structure of the well-known "Lundell" type, which includes in an annular ferromagnetic yoke generally designated 10, a first pole-forming ring element 12, and a further pole-forming ring element 14. The element 12 includes a cylindrical portion 16 extending circumferentially about the axis of the transducer to form an annular coil-receiving recess 18 therein, in which is wound an energizing coil 20. The ring element 14 is received within an annular groove 22 at one end of the cylindrical portion 16, and cemented or otherwise suitably secured therein. Circumferentially spaced within the elements 12 and 14 are two series of circumferentially-alternated pole pieces 24 and 26, respectively, which extend generally parallel to the yoke's major axis in opposite axial directions. Spaced within the yoke 10 and forming an annular air gap 28 therewith, is an annular return ring 30 which is also formed of ferromagnetic material.

Energization of the winding 20 produces a generally helicotoroidal magnetic field which flows across the air gap 28 and through the return ring 30, between each adjacent pair of the opposed poles 24 and 26. The Lundell-type core structure is well known, and in itself forms no part of the present invention.

Interposed in the air gap 28 is an annular armature 32 of any suitable non-magnetic material having adequate strength, such as aluminum. A series of pancake coils 34 are circumferentially spaced about the armature 32 and are connected in two-series-opposed groups circumferentially alternating with one another. Each coil 34 extends through an arc substantially equal to the arcuate pitch of adjacent opposed poles 24 and 26, so that in a null position shown, the radial central axis of each pole extends between adjacent coils. In the null position, each coil is threaded equally by flux flowing in opposite senses to and from poles across the air gap 28. However, as the armature is angularly displaced from the null position, the coupling of each coil with the adjacent opposed poles becomes unequal.

The transducer is shown in conjunction with a schematically illustrated gyroscopic device in FIG. 2 to demonstrate a typical application. In this illustration, the core structure, including the yoke 10 and the return ring 30, are stationarily mounted in a casing 36 concentrically about the axis shown, and the armature 32 is carried upon a radial disc 38 of a gimbal axle 40. The device may alternatively be utilized to torque the gimbal, or automatically to sense the angular displacement of the gimbal from the null position, by suitable connection and energization, as hereinafter described.

Figure 3:
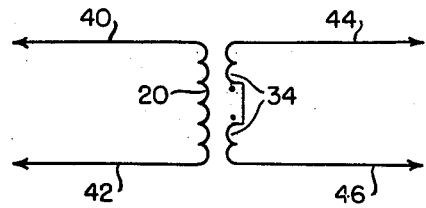
FIG. 3 is a schematic illustration of the electrical connections of the coils.
Figure 4:
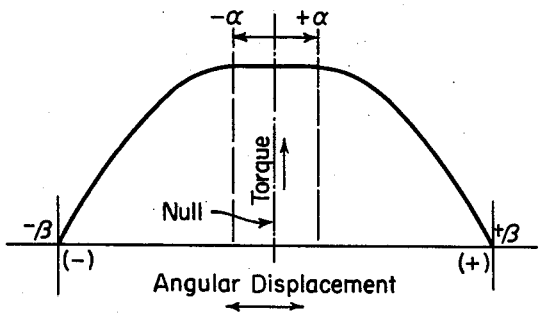
FIG. 4 is a diagram showing the relationship between the angular displacement of the armature and the torque produced by the transducer when utilized as a torque motor.

In FIG. 3, the connection of the coils 20 and 34 is schematically illustrated. The coils 34 are connected and arranged in two circumferentially-alternated series-opposed groups. For use in an A.C. or D.C. torque motor, both windings are energized with alternating or direct current by means of leads 40, 42, and 44, 46, respectively. The torque produced is proportional to the product of the applied currents, and the relationship between the resulting torque and the angular displacement of the armature is shown in the diagram of FIG. 4. In the null position, maximum torque is experienced because the conductors of each coil 34 lie in that portion of the air gap 28 in which the magnetic flux density set up by coil 20 is a maximum. A substantially uniform torque is maintained over an angular displacement $+/-\alpha$. The torque then diminishes rapidly as the displacement is increased, and disappears as an angular displacement $+/-\beta$ is approached, at which point each coil 34 is centered about one of the poles 24 or 26, and the coil conductors lie in a zero-value magnetic field. The range of displacement over which substantially linear torque is experienced is determined by the circumferential width of the poles 24 and 26.

Figure 5:
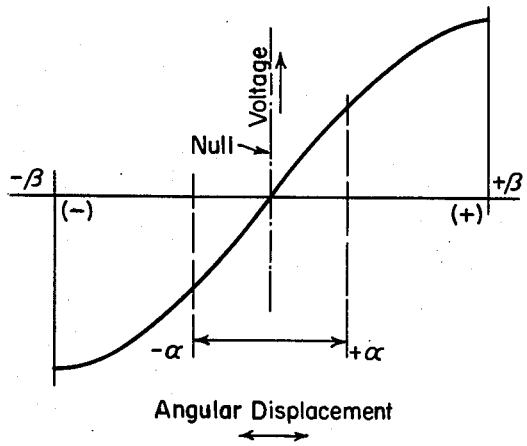
FIG. 5 is a diagram showing the relationship between the angular displacement of the armature and the output voltage of the armature coils when the transducer is utilized as a displacement-sensing or "pick-off" device.

In use as a pick-off device to measure the sense and magnitude of angular displacements of the armature, the leads 40 and 42 are connected to an alternating current source of predetermined frequency, and the leads 44 and 46 are connected in parallel to a load, typically a fixed resistor, and suitable means for indicating the magnitude and phase relationship of voltage induced in the coils 34. The response characteristic is shown by the diagram of FIG. 5. The output voltage maintains a substantially linear response over a range of angular displacements $+/-\alpha$ from the null position. With each coil 34 having equal coupling with adjacent opposed poles in the null position, it is threaded by opposed flux of equal intensity, so that no net output voltage results. However, angular displacement produces imbalance in the coupling, which increases linearly until each coil passes away from the faces of the poles. The response characteristic exhibits sinusoidal form upon further angular displacement toward the extreme angles $+/-\beta$, at which each coil is centered about a pole. The angle $\alpha$ may typically be about 5°, and this displacement is sufficient to afford linear response characteristics in a gyroscopic apparatus.

It will be apparent from the foregoing description that the combination of the Lundell-type core structure with the cylindrical armature having a pancake coil structure as described, affords an improved electromagnetic transducer in which not only is a minimum of mass required to be mounted upon the rotatable apparatus in conjunction with which the transducer is utilized, but also in which the efficiency of the transducing function, together with the accuracy and sensitivity of response, is improved. The structure is inherently free from reaction torques because of the absence of magnetic material from the armature. Various changes and modifications will readily occur to those skilled in the art without departing from the true spirit and scope of the invention, which I accordingly intend to define in the appended claims without limitation to specific details of the construction and arrangement herein described by way of illustration.

What I claim is:

1. An electromagnetic transducer comprising, in combination: an electromagnetic core structure including a cylindrical ring structure having two groups of circumferentially-spaced pole pieces; the pieces of the two groups alternating circumferentially and being cantilevered in opposite axial ends of said ring structure, and extending radially inwardly from said ring structure and thence in opposite axial directions generally parallel to the major axis of said ring structure, to form two groups of opposed poles; an annular energizing winding on said core structure extending circumferentially about said major axis and lying radially intermediate said ring structure and said pole pieces; an annular non-magnetic armature arranged concentrically within said ring structure and radially spaced therefrom to form an annular air gap; and a plurality of pancake coils mounted in circumferentially-spaced relation about said armature with the winding axis of each coil extending radially to said major axis; each of said pancake coils extending circumferentially through an arc not greater than the angular spacing between the centers of adjacent ones of said poles, such that in a null position of said armature each of said coils has equal magnetic coupling with adjacent opposed poles; said armature being mounted for angular displacement with respect to said core structure to unbalance the magnetic coupling of each of said pancake coils with the adjacent opposed poles.

2. An electromagnetic transducer as recited in claim 1, together with a return ring arranged concentrically within said armature and radially spaced therefrom.

3. An electromagnetic transducer as recited in claim 1, in which said coils are connected and arranged in two circumferentially-alternated series-opposed groups.

References Cited in the file of this patent

UNITED STATES PATENTS

| | | |
|---|---|---|
| 2,669,126 | Simmons et al. | Feb. 16, 1954 |
| 2,756,357 | Schaberg | July 24, 1956 |
| 2,779,882 | Ishikawa | Jan. 29, 1957 |
| 3,019,403 | Kamm | Jan. 30, 1962 |